(12) United States Patent
Kao

(10) Patent No.: US 9,954,674 B2
(45) Date of Patent: Apr. 24, 2018

(54) MULTIMEDIA SIGNAL TRANSMISSION DEVICE AND TRANSMISSION METHOD THEREOF

(71) Applicant: ATEN International Co., Ltd., New Taipei (TW)

(72) Inventor: Kuo-Feng Kao, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 15/250,387

(22) Filed: Aug. 29, 2016

(65) Prior Publication Data

US 2017/0078082 A1    Mar. 16, 2017

(30) Foreign Application Priority Data

Sep. 10, 2015   (TW) .............................. 104129964 A

(51) Int. Cl.
    *H04B 10/25*    (2013.01)
    *H04L 7/00*     (2006.01)
    (Continued)

(52) U.S. Cl.
    CPC .......... *H04L 7/0075* (2013.01); *H04L 7/0091* (2013.01); *H04N 7/22* (2013.01); *H04N 5/765* (2013.01); *H04N 5/775* (2013.01)

(58) Field of Classification Search
    CPC ...................................................... H04B 10/25
    See application file for complete search history.

(56) References Cited

U.S. PATENT DOCUMENTS 7,406,101 B1 *  7/2008  Obeidat ................ H03K 5/135
                                                    370/252
7,860,398 B2 * 12/2010  Tatum .................. G02B 6/4201
                                                    398/139
(Continued)

FOREIGN PATENT DOCUMENTS

CN         202334778 U     7/2012
CN         202488591 U    10/2012
(Continued)

OTHER PUBLICATIONS

Taiwanese Office Action, dated Jul. 19, 2016, in a counterpart Taiwanese patent application, No. TW 104129964.

(Continued)

*Primary Examiner* — Shi K Li
(74) *Attorney, Agent, or Firm* — Chen Yoshimura LLP

(57) ABSTRACT

A multimedia signal transmission device includes: a clock signal detector for detecting a clock signal from a signal source and generating a clock index which specifies a frequency of the clock signal; a first microcontroller unit for receiving the clock index and for receiving multiple differential signals from the signal source and generating packets containing these signals; first and second photoelectric modules for transmitting and receiving the multiple minimized differential data signals and the packets as optical signals; a second microcontroller unit for generating the clock index and the multiple differential signals from the packets; and a clock data recovery circuit for receiving one of the multiple minimized differential data signals and receiving the clock index from the second microcontroller unit, and for recovering the clock signal having the specified frequency and synchronized to the multiple minimized differential data signals.

15 Claims, 6 Drawing Sheets

(51) Int. Cl.
*H04N 7/22* (2006.01)
*H04N 5/775* (2006.01)
*H04N 5/765* (2006.01)

(56) References Cited

U.S. PATENT DOCUMENTS

| | | | |
|---|---|---|---|
| 2006/0280055 A1* | 12/2006 | Miller | G09G 5/006 |
| | | | 369/44.11 |
| 2007/0177028 A1* | 8/2007 | Kyoung | G06F 3/005 |
| | | | 348/222.1 |
| 2009/0167750 A1* | 7/2009 | Hong | G09G 3/2096 |
| | | | 345/213 |
| 2010/0043045 A1* | 2/2010 | Shakiba | H04B 3/32 |
| | | | 725/119 |
| 2010/0066919 A1 | 3/2010 | Nakajima et al. | |
| 2010/0321573 A1 | 12/2010 | Bohm | |
| 2012/0082249 A1* | 4/2012 | Hsueh | H04L 7/0008 |
| | | | 375/259 |
| 2013/0128124 A1 | 5/2013 | Suzuki et al. | |
| 2014/0036156 A1 | 2/2014 | Nakajima et al. | |
| 2014/0285722 A1 | 9/2014 | Nakajima et al. | |
| 2014/0341514 A1 | 11/2014 | Lin | |
| 2015/0103254 A1 | 4/2015 | Nakajima et al. | |
| 2016/0028987 A1 | 1/2016 | Nakajima et al. | |
| 2016/0073121 A1* | 3/2016 | Lavoie | H04L 12/6418 |
| | | | 348/441 |
| 2016/0373809 A1 | 12/2016 | Nakajima et al. | |

FOREIGN PATENT DOCUMENTS

| | | |
|---|---|---|
| TW | 201103289 A | 1/2011 |
| TW | 201445204 A | 12/2014 |
| WO | 2007027948 A2 | 3/2007 |
| WO | 2008056707 A1 | 5/2008 |

OTHER PUBLICATIONS

Japanese Office Action, dated Aug. 22, 2017 in a counterpart Japanese patent application, No. JP 2016-001023. English translation of "The Reason(s) of Rejection" is attached.

Extended European Search Report in corresponding application EP 16187954.9, dated Jan. 2, 2017.

Nagano, "Kousoku video interface HDMI & Display Port no subete", 2nd edition, CQ Publishing Co., Ltd., Apr. 1, 2014, pp. 14-17, 25-32, 40-48, 57-59.

Horie, "Audio shingou shori de manabu DSP No. 5, I2C port de A-D converter o seigyo suru", Interface, vol. 33, No. 7, CQ Publishing Co., Ltd., Jul. 1, 2007, pp. 155-166.

Serii, "Tokushu maikon serial tsuushin handbook Chapter 6, I2C interface no tsukaikata", Transistor Gijyutsu, CQ Publishing Co., Ltd., vol. 43, No. 6, Jun. 1, 2006, pp. 160-167.

* cited by examiner

MULTIMEDIA SIGNAL TRANSMISSION DEVICE AND TRANSMISSION METHOD THEREOF

BACKGROUND OF THE INVENTION

Field of the Invention

This invention relates to the field of signal transmission, and in particular, it relates to a long distance signal transmission device and related method for high definition multimedia interface.

Description of Related Art

Recent rapid technological developments are bringing wide use of multimedia audiovisual technologies around the globe. For example, multimedia technologies such as home theater 3D, Blu-ray technology, etc. are becoming available. With the fast growth of multimedia audiovisual entertainment products, functions such as multimedia audiovisual playback, touch screen capabilities, high quality communication services etc. are becoming popular trends for various electronic products. These advancements in multimedia technologies bring changes to new generations of audiovisual multimedia electronic products. Therefore, innovative multimedia audiovisual transmission technologies are an important aspect of multimedia audiovisual technologies.

High Definition Multimedia Interface (HDMI) is an all digital video and audio transmission interface which can transmit uncompressed audio and video signals. HDMI interface can be used in products such as set-top boxes, DVD players, personal computers, video game devices, integrated amplifiers, digital audio and television, etc. HDMI technologies are licensed to be used by over 1200 manufacturers; globally, over 1 billion consumer electronic devices use HDMI technologies, making HDMI a mainstream interface for multimedia transmission. HDMI can simultaneously transmit audio and video signals. Because audio and video signals use the same transmission cable, rather than using multiple transmission cables as in conventional transmission technologies, wire management is greatly simplified. For consumers, HDMI technology not only can provide clear and high quality images, because audio and video signals use the same cable, it can also simplify home theater systems and reduce difficulties in system installation.

When using HDMI to transmit multimedia audiovisual signals, the main signal transmission technology used is Transition Minimized Differential Signaling (TMDS). TMDS is a high speed data transmission technology developed by Silicon Image Inc. of the U.S.A., and can be used in DVI and HDMI audiovisual transmission interfaces. TMDS has four channels, the first three are respectively YU(Pb)V(Pr) transmission channels, or they can be considered RGB transmission channels, and the fourth channel is a clock signal channel, to provide a unified clock used for signal transmission. When transmitting signals using HDMI, various video and audio data are packaged by the HDMI transceiver chip into data packets using TMDS technology.

In other words, the transmission framework of HDMI audiovisual signal transmission includes, the end that transmits the TMDS signal is the transmitting end, the end that receives the TMDS signal is the receiving end, and the main connections are three pairs of TMDS data channels and one pair of TMDS clock channel. When the receiving end is connected to the transmitting end, after the transmitting end detects the Hot Plug Detect (HPD) signals, it reads data in the Extended Display Identification Data (EDID) via the Data Display Channel (DDC). EDID includes, for example, information regarding capabilities of the receiving end, information regarding the manufacturer, manufacturing date, the resolution supported by the receiving end, etc. The transmitting end then starts to transmit TMDS signals.

Generally speaking, the maximum transmission speed of each channel of HDMI technology is 165 MHz (4.95 Gb/s). With the improvement of HDMI transmission technologies, the bandwidth of HDMI is gradually increasing. For example, for HDMI Versions 1.0-1.2a, the maximum TMDS bandwidth is the above-mentioned 4.95 Gb/s; for Version 1.3, the maximum TMDS bandwidth is 10.2 Gb/s; and for Version 1.4, the maximum TMDS bandwidth is also 10.2 Gb/s. For version 2.0, the maximum TMDS bandwidth is 18 Gb/s, which can support quite large video bandwidth (14.4 Gb/s), audio bandwidth (49.152 Mb/s); compared to Version 1.0, it can support more different functions and channels, such as Ethernet channel, audio return channel, 3D Over HDMI, support for 4K×2K resolution, enhanced support for color space depth, Micro HDMI connector, etc.

Standard HDMI performance can satisfy the requirements of most consumers. The cable performance can support 74.5 MHz, and maximum reliable transmission of 1080i or 720p signals is 15 meters. On the other hand, high speed HDMI cables can achieve even higher performance levels, to meet requirements of high-end home theater systems, where the cable performance can support 340 MHz, and can reliable transmit signals (and higher definition signals) as far as 7.5 meters. Because of higher requirement of HDMI bandwidth, the HDMI speed instead limits the HDMI transmission distance. Whether for standard HDMI cable or high speed HDMI cable, the maximum transmission distance is still limited; this range limit is one of the main problems in its application. To transmit HDMI signals over longer distances, electrical cables cannot be used; fiber optic cables can be used instead, by converting electrical signals to optical signals, and converting optical signals back to electrical signals at the receiving end. Because optical signals can be transmitted over much longer distances, currently, while many options are available for transmission under 100 meters, HDMI devices for transmission over 100 meters typically use fiber optic cables to extend signal transmission range.

Refer to FIG. 1, which schematically illustrates long distance signal transmission devices for high definition multimedia signals according to conventional technologies. Such conventional devices for long distance signal transmission, for transmitting HDMI 2.0 signals, includes an HDMI transmitter 901 and an HDMI receiver 902. The HDMI transmitter 901 includes HDMI input interface 911, HDMI receiver chip 912, field-programmable gate array (FPGA) main processor chip 913, high-speed signal processor chip 914, and photoelectric module 915. The HDMI receiver 902 includes photoelectric module 925, FPGA main processor chip 923, HDMI transmitter chip 922, high-speed signal processor chip 924, and HDMI output interface 921. The signal from a signal source is inputted via the HDMI input interface 911, and transmitted by HDMI receiver chip 912 to the FPGA main processor chip 913; the FPGA main processor chip 913 re-packages the data and transmits the data packets to the high-speed signal processor chip 914 and photoelectric module 915. The data packets are transmitted via the optical fibers over a long distance to the photoelectric module 925 of the receiver; the data packets are unpackaged back to the original signal by the high-speed signal processor (synthesizer) chip 924 and the FPGA main processor chip 923, and transmitted to the HDMI output interface 921.

In the above conventional HDMI long distance signal transmission devices, the FPGA chip is typically very costly, and the main design cost of the system are the cost of the FPGA chips and the high speed signal processor and synthesizer chips. For example, for HDMI 2.0, its bandwidth is about 18 Gb/s, and requires two sets of FPGA combined; and to further increase transmission bandwidth, it is required to increase the high speed circuits of the of FPGAs and the signal synthesizer chips. Thus, the complexity and cost of the devices will increase. Moreover, because the FPGAs need to process large amount of packaging and un-packaging of packets, it will cause a reduction in signal transmission quality.

SUMMARY

Accordingly, the present invention is directed to an apparatus and related method that substantially obviates one or more of the problems due to limitations and disadvantages of the related art. An object of the present invention is to provide a long distance, high image quality multimedia signal transmission device, to solve the problem that conventional long distance signal transmission device must use FPGA chips. The transmission devices according to embodiments of the present invention can achieve multimedia signal transmission over a long distance without converting the input multimedia signals by FPGA chips or high speed signal converter chips, without transmitting clock signals to the photoelectric module, and without packaging the TMDS signals into packets.

To achieve these and/or other objects, the present invention provides a multimedia signal transmission device which includes: a clock signal detector, coupled to a signal source, for detecting a clock signal inputted from the signal source and generating a clock index which contains information specifying a frequency of the clock signal; a first microcontroller unit, coupled to the signal source, for receiving the clock index outputted by the clock signal detector, and for receiving multiple differential signals from the signal source; a first photoelectric module, couple to the first microcontroller unit and the signal source, for receiving multiple minimized differential data signals inputted from the signal source and the clock index and the multiple differential signals transmitted from the first microcontroller unit and converting them to optical signals; a second photoelectric module, coupled to the first photoelectric module, for receiving the optical signals from the first photoelectric module and converting them to the multiple minimized differential data signals, the clock index and the multiple differential signals; a second microcontroller unit, coupled to the second photoelectric module, for generating the clock index and the multiple differential signals; and a clock data recovery circuit, coupled to the second microcontroller unit and the second photoelectric module and receiving the clock index from the second microcontroller unit, for receiving one of the multiple minimized differential data signals inputted from the second photoelectric module, and for recovering the clock signal which has the frequency specified in the clock index and is synchronized to the one of the multiple minimized differential data signals.

In another aspect, the present invention provides a long distance transmission method for high definition multimedia signals, which solves a problem of conventional long distance HDMI transmission methods which required the conventional method to use an FPGA chip; in other words, the method according to embodiments of the present invention can transmit multimedia signal over a long distance without using FPGA chips or high speed signal converter chips, without transmitting clock signals to the photoelectric module, and without packaging the TMDS signals into packets.

To achieve the above objects, the present invention provides a multimedia signal transmission method which includes: transmitting multiple minimized differential data signals, a clock signal and multiple differential signals from a signal source to a multimedia signal transmission device; a clock signal detector receiving the clock signal, detecting the clock signal to generate a clock index which contains information specifying a frequency of the clock signal, and transmitting the clock index to a first microcontroller unit; the first microcontroller unit receiving the multiple differential signals and the clock index, combining the multiple differential signals and the clock index into multiple packets, and transmitting the multiple packets to a first photoelectric module; the first photoelectric module converting the multiple minimized differential data signals from the signal source and the multiple packets to optical signals and transmitting them over plurality of optical fibers; the optical fibers transmitting the optical signals of the multiple minimized differential data signals and the multiple packets to a second photoelectric module; the second photoelectric module receiving the optical signals and converting them back to the multiple minimized differential data signals from the signal source and the multiple packets, transmitting one of the multiple minimized differential data signals to a clock data recovery circuit, transmitting the multiple packets to a second microcontroller unit, and transmitting two of the multiple minimized differential data signals to a destination device; the second microcontroller unit converting the multiple packets back to the multiple differential signals and the clock index, transmitting the multiple differential signals to the destination device, and transmitting the clock index to the clock data recovery circuit; the clock data recovery circuit receiving the one of the multiple minimized differential data signals and the clock index, recovering the clock signal which has the frequency specified in the clock index and is synchronized to the one of the multiple minimized differential data signals, and transmitting the recovered clock signal to the destination device; and the destination device receiving the multiple minimized differential data signals, the clock signal and the multiple differential signals from the multimedia signal transmission device.

To achieve the above and further objects, the signal source transmits the multiple minimized differential data signals, the clock signal and the multiple differential signals to the multimedia signal transmission device, and the destination device receives the multiple minimized differential data signals, the clock signal and the multiple differential signals via the first photoelectric module and the second photoelectric module of the multimedia signal transmission device.

To achieve the above and further objects, the multiple differential signals include VDD signals, HPD signals, I2C signals and CEC signals, and the multiple minimized differential data signals include D0, D1 and D2 signals.

To achieve the above and further objects, the first microcontroller unit includes a first high speed sampling device, which uses high speed sampling techniques to combine the multiple differential signals and the clock index into multiple packets, and the second microcontroller unit includes a second high speed sampling device, which uses high speed sampling techniques to convert the multiple packets back to the multiple differential signals and the clock index.

To achieve the above and further objects, the first and second high speed sampling device uses high speed sampling techniques to combine the multiple differential signals and the clock index sampled in a predetermined sequence into the multiple packets or to convert the multiple packets back to the multiple differential signals and the clock index.

To achieve the above and further objects, the multimedia signal transmission device further includes four channel optical fibers connected between the first photoelectric module and the second photoelectric module using Quad Small Form-factor Pluggable (QSFP) connection, wherein the first photoelectric module transmits D0, D1 and D2 signals respectively to three of the four channels of the optical fibers, and the first photoelectric module transmits the multiple packets to one of the four channels of the optical fibers.

To achieve the above and further objects, the multimedia signal transmission device further includes a first level shifter, coupled between the first photoelectric module and the signal source, for adjusting an input voltage level.

To achieve the above and further objects, the multimedia signal transmission device further includes a second level shifter, coupled between the second photoelectric module and the destination device, for adjusting an output voltage level.

Compared to conventional technologies, in the multimedia signal transmission device and method according to embodiments of the present invention, during transmission, the clock signal is not transmitted to the photoelectric module, and the multiple minimized differential data signals are not re-packaged; rather, a clock data recovery circuit is provided to recover the clock signal, to accomplish long distance transmission of multimedia signals. Compared to conventional technologies, it can significantly simplify the framework of long distance transmission of high definition multimedia signals, effectively reduce the design or component cost of long distance transmission of high definition multimedia signals, and achieve higher transmission quality.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention are described in detail below. Based on this disclosure, those skilled in the art can understand the multimedia signal transmission device and related method and can appreciate their advantages.

Those skilled in the art will also appreciate that some details are not required to implement the invention. Further, some structures and their functions well know to those skilled in the art are not described in detail to simplify the description. The terms used in this disclosure should be given broadest reasonable interpretations, and understood in accordance with the descriptions below.

The invention is described using the preferred embodiments, and the embodiments only illustrate but do not limit the scope of the invention. Thus, in addition to the preferred embodiments described here, the invention may be broadly applied to other embodiments.

Figure 1:
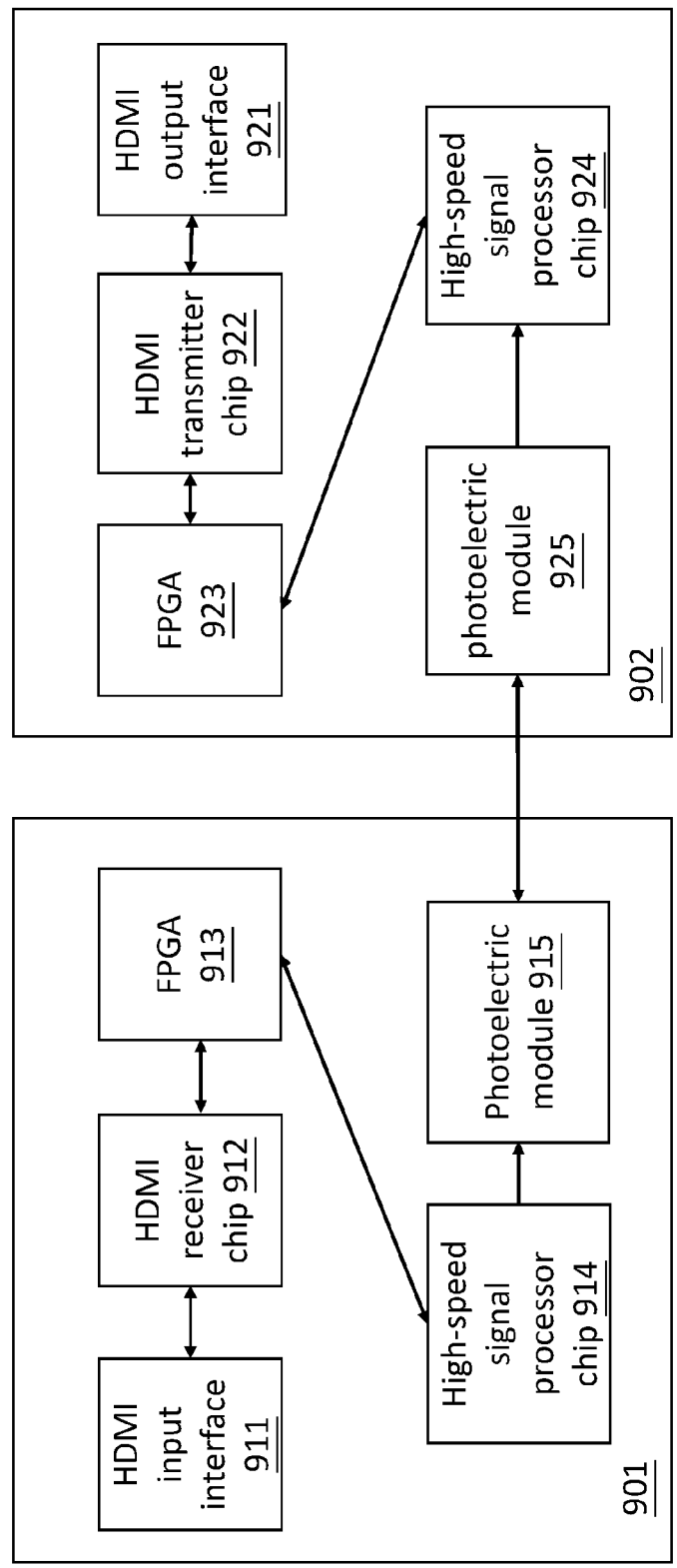
FIG. 1 schematically illustrates long distance signal transmission devices for high definition multimedia signals according to conventional technologies.
Figure 2:
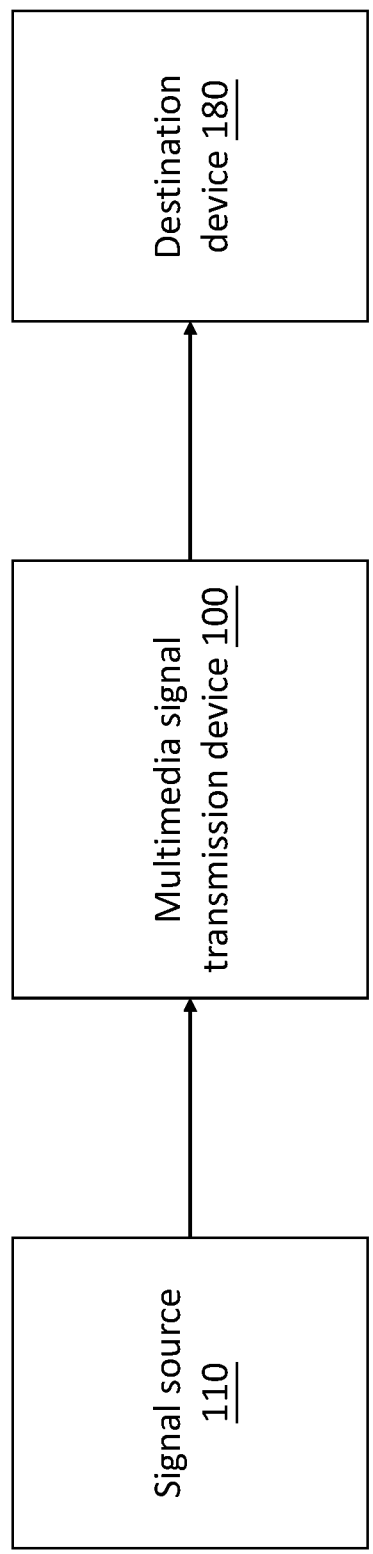
FIG. 2 schematically illustrates multimedia signal transmission using a signal transmission device according to embodiments of the present invention.

FIG. 2 schematically illustrates multimedia signal transmission using a signal transmission device according to embodiments of the present invention. The signal source 110 transmits signals to the destination device 180 via the multimedia signal transmission device 100. The signals may be, for example, HDMI video and audio signals, DVI video signals, or other signals. In some embodiments, the signal source 110 and/or the destination device 180 may be relay devices.

The destination device 180 includes a physical communication port, configured to be coupled to the multimedia signal transmission device 100. The signal source 110 also includes a physical communication port, configured to be coupled to the multimedia signal transmission device 100. The signals are transmitted, via the physical communication ports and via the multimedia signal transmission device 100, from the signal source 110 to the destination device 180.

The multimedia signal transmission device 100 are compatible with transmission technologies of all currently known versions of HDMI, including, in HDMIVersions1.0-1.2a, the maximum TMDS bandwidth is 4.95 Gb/s, in HDMI Version 1.3, the maximum TMDS bandwidth is 10.2 Gb/s, in HDMI Version 1.4, the maximum TMDS bandwidth is 10.2 Gb/s, and in HDMI Version 2.0, the maximum TMDS bandwidth is up to 18 Gb/s.

In some embodiments, the components of the signal source 110, the destination device 180 and the multimedia signal transmission device 100 may be stored as data in a non-volatile computer readable memory (such as hard disk drive, flash drive, optical drive, etc.). These components may be behavioral level, register transfer level, logic component level, transistor level, and layout geometry level.

Figure 3:
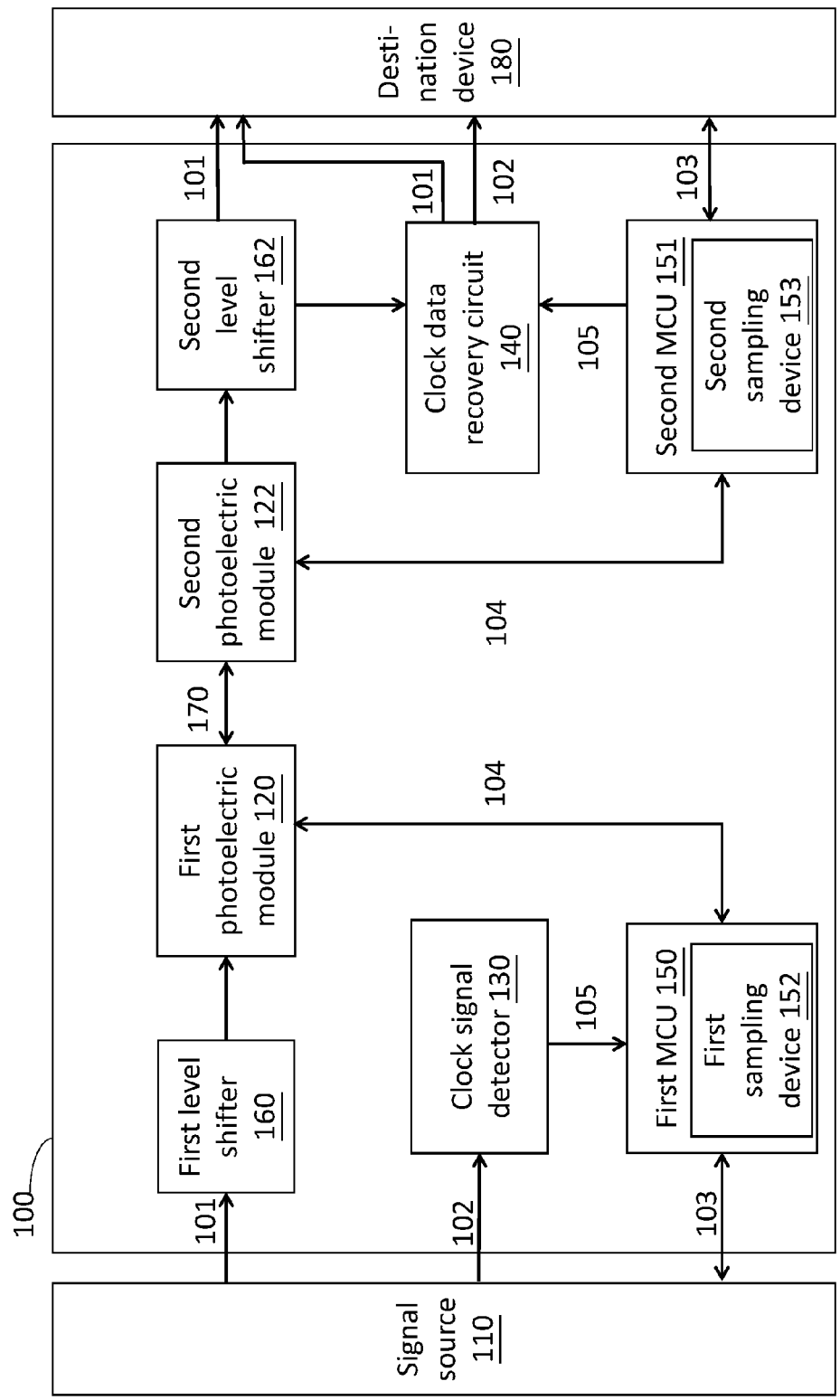
FIG. 3 schematically illustrates the structure of a multimedia signal transmission device according to an embodiment of the present invention.

FIG. 3 schematically illustrates the structure of a multimedia signal transmission device according to an embodiment of the present invention. In one embodiment of the invention, a multimedia signal transmission device 100 includes: a clock signal detector 130, coupled to the signal source 110, for detecting the input clock signal 102 of the signal source 110 and generating a clock index 105; a first microcontroller unit 150, coupled to the signal source 110, for receiving the clock index 105 outputted by the clock signal detector 130, for receiving multiple differential signals 103 inputted from the signal source 110, and for generating packets 104 (described in detail later); a first photoelectric module 120, coupled to the first microcontroller unit 150 and the signal source 110, for receiving multiple minimized differential data signals 101 inputted from signal source 110 and the packets transmitted from the first microcontroller unit 150; a second photoelectric module 122, coupled to the first photoelectric module 120, for receiving the multiple minimized differential data signals 101 and other signals from the first photoelectric module 120; a second microcontroller unit 151 coupled to the second photoelectric module 122, for generating a clock index 105; and a clock data recovery circuit 140, coupled to the second microcontroller unit 151 and the second photoelectric module 122, for receiving one of the multiple minimized differential data signals 101 from the second photoelectric module 122, and generating recovered clock signal 102 based on the clock index 105 received from the second microcontroller unit 151.

Referring to FIG. 3, in one embodiment, the signal source 110 inputs the multiple minimized differential data signals 101, the clock signal 102 and the multiple differential signals 103 into the multimedia signal transmission device 100. The clock signal detector 130 of the multimedia signal transmission device 100 receives the clock signal 102 from the signal source 110. The clock signal detector 130 is coupled to the signal source 110, for detecting the clock signal 102 from the signal source 110 and generating a clock index 105, and transmitting the generated clock index 105 to the first microcontroller unit 150. The clock index 105 contains information (referred to as the frequency setting values) which specifies the frequency of the clock signal 102. The first microcontroller unit 150 is respectively coupled to the signal source 110, the clock signal detector 130 and the first photoelectric module 120. In this embodiment, the first microcontroller unit 150 receives the multiple differential signals 103 from the signal source 110 and the clock index 105 from the clock signal detector 130. The first microcontroller unit (MCU) 150 described here is a single chip that includes a central processing unit (CPU), memory, timer/counter, various input/output interfaces or devices such as analog-digital converter, timer, serial port, and other serial communication interface such as I2C, Serial Peripheral Interface, LAN controller, etc., and is not limited to such. These integrated devices can be operated by specific commands. In this embodiment, the first microcontroller unit 150 may further include a first high speed sampling device 152, which can use high speed sampling techniques to combine the multiple differential signals 103 and the clock index 105 into multiple packets 104 and transmit them to the first photoelectric module 120.

Referring to FIG. 3, the first photoelectric module 120, coupled between the first microcontroller unit 150 and the optical fibers 170, and also coupled between the signal source 110 and the optical fibers 170, is configured to receive the multiple minimized differential data signals 101 from the signal source 110 and the multiple packets 104 from the first microcontroller unit 150. The first photoelectric module 120 may include light emitting devices, light detecting devices, light guiding devices, optical fiber connectors such as FC type, SC type, ST type, LC type, and MT-RJ type, as well as a transmission module such as Giga Bitrate Interface Converter (GBIC), Small Form Pluggable (SFP) transceiver, Quad Small Form-factor Pluggable (QSFP) transceiver, etc. The optical fibers may include single mode optical fibers or multi-mode optical fibers. It should be noted that the photoelectric module and optical fiber combination described above are only examples but are not limiting, and any suitable combinations may be used based on practical needs of the optical communication channel. The first photoelectric module 120 is configured to convert the multiple minimized differential data signals 101 and multiple packets 104 (electrical signals) into optical signals and to transmit the optical signals to the second photoelectric module via the optical fibers.

Referring to FIG. 3, the second photoelectric module 122 is coupled to the other end of the optical fibers 170, and configured to receive the multiple minimized differential data signals 101 and multiple packets 104 (optical signals) transmitted by the first photoelectric module 120 via the optical fibers 170, and to convert the optical signal back to the original multiple minimized differential data signals 101 and multiple packets 104 (electrical signal). The second photoelectric module 122 may include light emitting devices, light detecting devices, light guiding devices, optical fiber connectors such as FC type, SC type, ST type, LC type, and MT-RJ type, as well as a transmission module such as Giga Bitrate Interface Converter (GBIC), Small Form Pluggable (SFP) transceiver, Quad Small Form-factor Pluggable (QSFP) transceiver, etc., but are not limited to such. The second photoelectric module 122 then transmits the multiple packets 104 to the second microcontroller unit 151, transmits one of the multiple minimized differential data signals 101 to the clock data recovery circuit 140, and transmits the other ones of the multiple minimized differential data signals 101 to the destination device 180.

Referring to FIG. 3, the second microcontroller unit (MCU) 151 may be similar to the first microcontroller unit 150, which includes a central processing unit (CPU), memory, timer/counter, various input/output interfaces or devices such as analog-digital converter, timer, serial port, and other serial communication interface such as I2C, Serial Peripheral Interface, LAN controller, etc., and is not limited to such. These integrated devices can be operated by specific commands. The second microcontroller unit 151 may further include a second high speed sampling device 153, configured to use high speed sampling techniques to convert the received multiple packets 104 back to the clock index 105 and multiple differential signals 103. The second microcontroller unit 151 then transmits the multiple differential signals 103 to the destination device 180, and transmits the clock index 105 to the clock data recovery circuit 140.

The clock data recovery circuit 140 may be a circuit, coupled to the second photoelectric module 122 and the second microcontroller unit 151. The clock data recovery circuit 140, after receiving the clock index 105 and the one of the multiple minimized differential data signals 101, extracts the frequency setting value (which specifies the frequency of the original clock signal 102) from them, and recovers (re-generates) the original clock signal 102 which has the specified frequency and is synchronized to the minimized differential data signals. The clock data recovery circuit 140 uses the one multiple minimized differential data signals 101 to synchronize the re-generated clock signal to the multiple minimized differential data signals. This method reduces interferences of the multiple minimized differential data signals 101 during transmission, and to achieve synchronous clock signals 102 at the two ends of the transmission. The functions of the clock data recovery circuit 140 is that the multimedia signal transmission device 100 does not need to transmit the clock signal 102 via the optical fibers 170, and does not need to combine the clock signal 102 and the multiple minimized differential data signals 101 into packets. This allows the signal transmission to maintain sufficient signal quality, and at the same time, to eliminate the design cost involved with FPGA which is used in conventional technology to package the clock signal. After synchronously recovering the original clock signal 102, the clock data recovery circuit 140 transmits the clock signal 102 and one of the multiple minimized differential data signals 101 to the destination device 180.

Referring to FIG. 3, the destination device 180 receives, via the first photoelectric module 120 and second photoelectric module 122 of the multimedia signal transmission device 100, the multiple minimized differential data signals 101, the clock signal 102, and the multiple differential signals 103.

Referring to FIG. 3, the multimedia signal transmission device 100 optionally includes a first level shifter 160, coupled between the first photoelectric module 120 and the signal source 110, to adjust the input voltage level to an appropriate level. The multimedia signal transmission device 100 optionally includes a second level shifter 162, coupled between the second photoelectric module 122 and the destination device 180, to adjust the output voltage level to an appropriate level.

Figure 4:
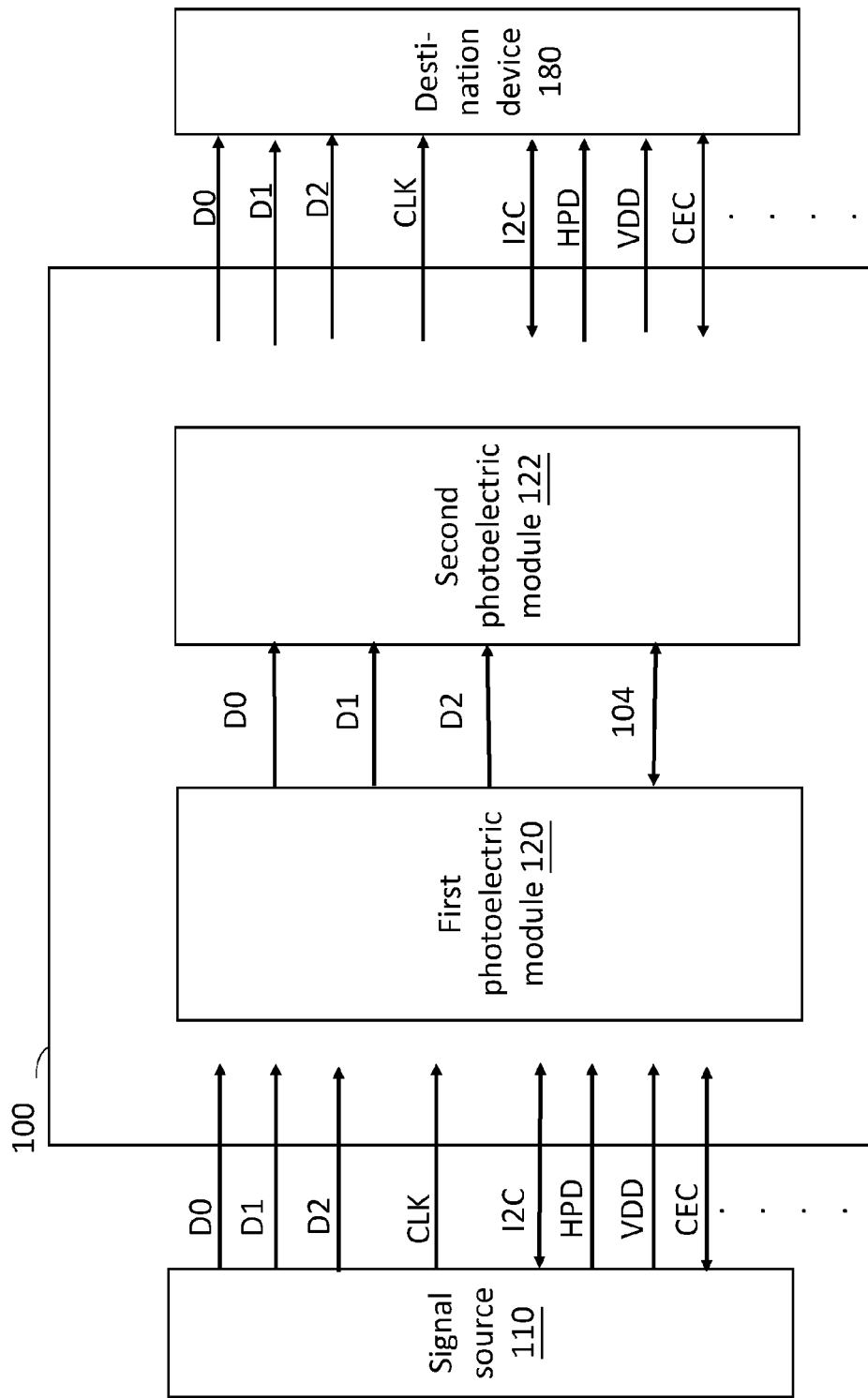
FIG. 4 schematically illustrates the signal transmission of the multimedia signal transmission device according to an embodiment of the present invention.

FIG. 4 schematically illustrates the signal transmission of the multimedia signal transmission device according to an embodiment of the present invention. In some embodiments, the signal source 110 transmits the multiple differential signals 103, clock signal 102 and the multiple minimized differential data signals 101 (as shown in FIG. 3) to the multimedia signal transmission device 100. The multiple minimized differential data signals 101 include D0, D1 and D2 signals, which are known TMDS signals that are transmitted using voltage difference between two pins (D+ and D−). The multiple differential signals 103 include CEC signals, HPD signals, I2C signals and VDD signals, but are not limited to such. It should be noted that the multiple differential signals 103 may also include other signals that are not the minimized differential data signals 101, depending on the format of the HDMI used. The I2C and CEC signals can be exchanged between the signal source 110 and the multimedia signal transmission device 100, while the VDD and HPD signals are transmitted in only one direction from the signal source 110 to the multimedia signal transmission device 100.

Referring to FIG. 4, the optical fibers 170 include a four-channel bundle QSFP connected between the first photoelectric module 120 and the second photoelectric module 122. The first photoelectric module 120 transmits the D0, D1 and D2 signal of the multiple minimized differential data signals 101 respectively to three of the four channels of the optical fibers 170, and transmits the multiple packets 104 to one of the four channels of the optical fibers 170. Finally, the multimedia signal transmission device 100 transmits the signals from the signal source 110, including the multiple minimized differential data signals 101 (D0, D1, D2), clock signal 102 (CLK) and differential signals (I2C, HPD, VDD, CEC) etc., to the destination device 180.

Figure 5:
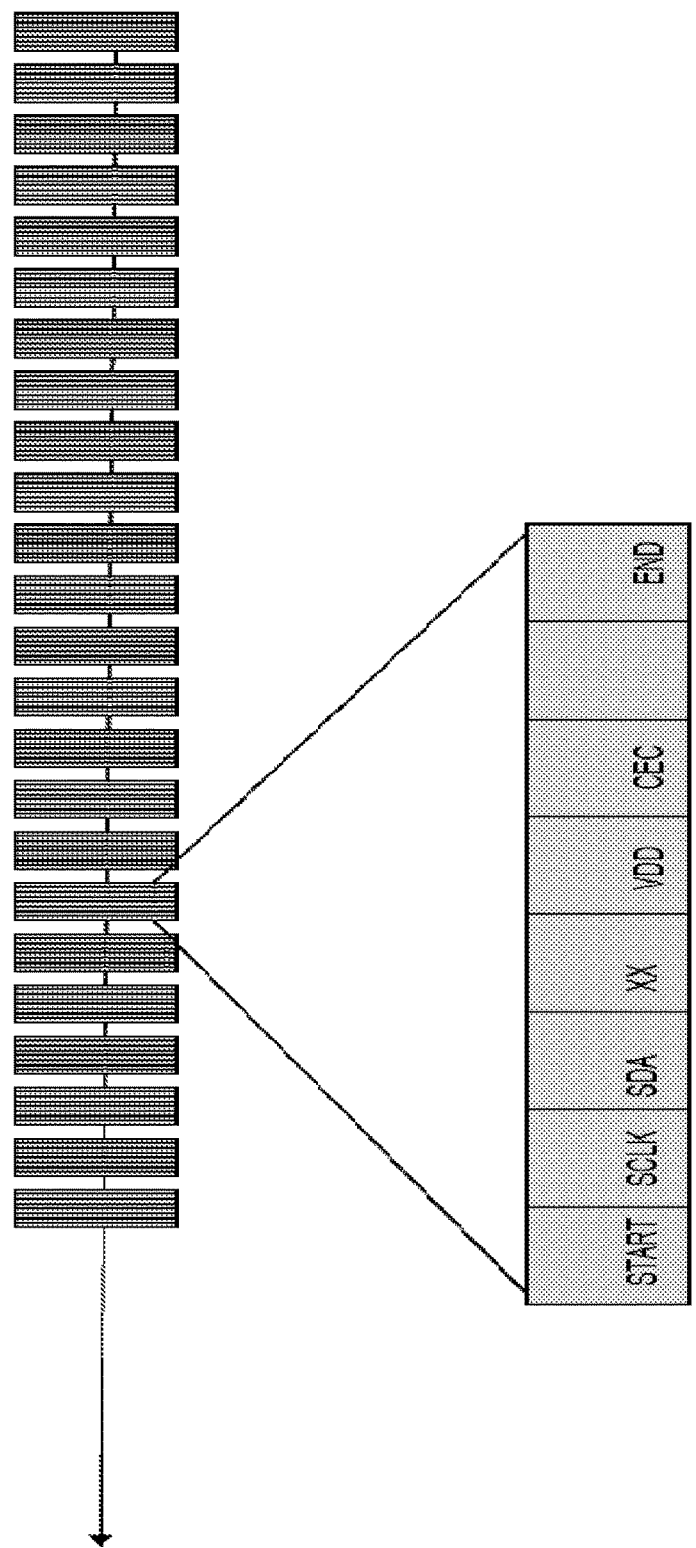
FIG. 5 schematically illustrates the high speed sampling operation of the multimedia signal transmission device according to an embodiment of the present invention.

FIG. 5 schematically illustrates high speed sampling operation of the multimedia signal transmission device according to an embodiment of the present invention. In some embodiments, the first microcontroller unit 150, using high speed sampling techniques, combines the multiple differential signals 103 and clock index 105 sampled in a predetermined sequence into multiple packets 104. For example, the first high speed sampling device 152 of the first microcontroller unit 150 combines the SCLK signal of the I2C, the SDA signal of the I2C, the HPD signal, the VDD signal, and the CEC signal in a predetermined sequence to form the multiple packets 104. The sequence is not limited to the example shown here and other sequences may be used, as long as the sequence is the same in the multiple packets 104, and the clock index 105 uses another packet format. On the other hand, the second high speed sampling device 153 of the second microcontroller unit 151 converts the received multiple packets 104 back to the SCLK signal of the I2C, the SDA signal of the I2C, the HPD signal, the VDD signal, and the CEC signal. The SDA signal and the HPD signal are transmitted bi-directionally, so the second microcontroller unit 151 can combine the SDA signal and the HPD signal again into packets and transmit them via the optical fibers 170 and the photoelectric modules 120 and 122 back to the first microcontroller unit 150. In other words, the SDA signal and the HPD signal can be transmitted between the signal source 110 and the destination device 180.

Figure 6:
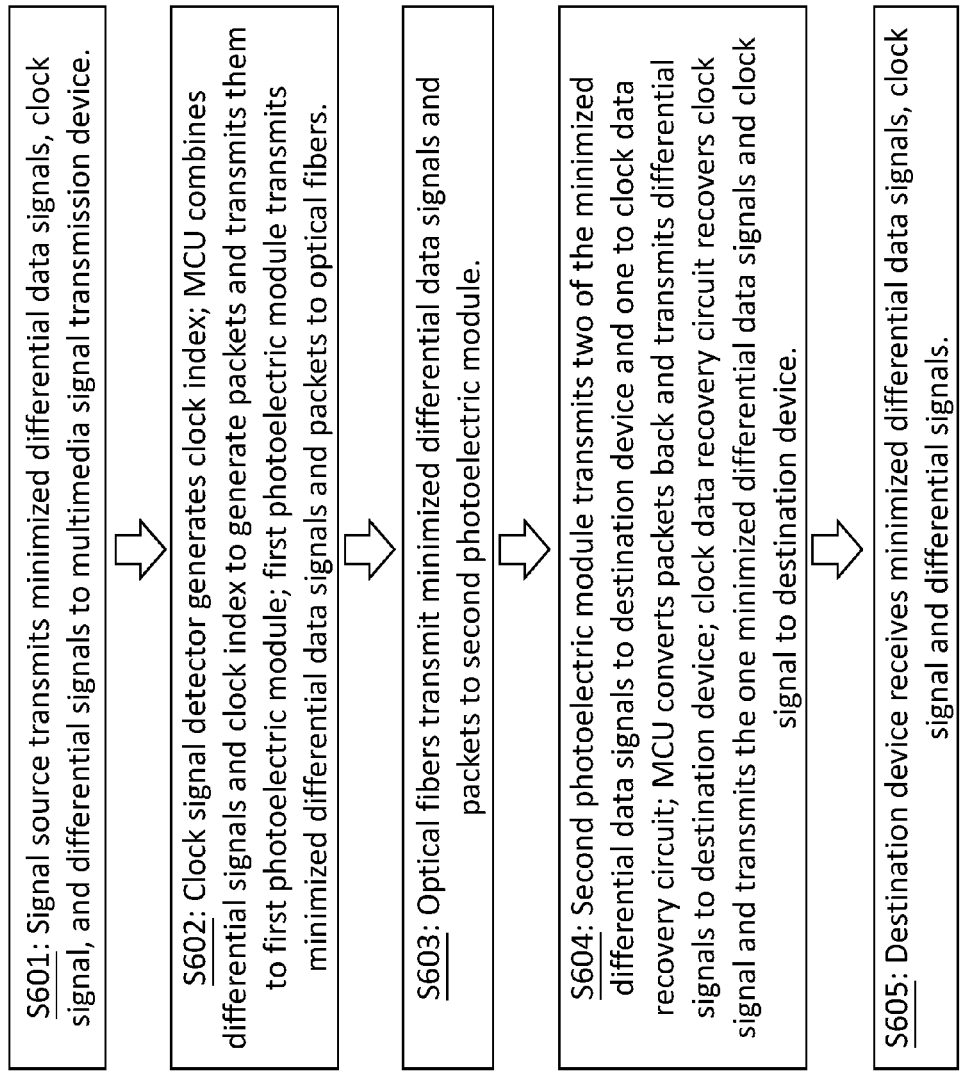
FIG. 6 schematically illustrates a multimedia signal transmission method according to an embodiment of the present invention.

FIG. 6 schematically illustrates a multimedia signal transmission method according to an embodiment of the present invention. The method flow can be understood by also referring to FIGS. 2-5. In some embodiments, the multimedia signal transmission method includes the following steps. In step S601, multiple minimized differential data signals 101, a clock signal 102, and multiple differential signals 103 are transmitted from a signal source 110 to a multimedia signal transmission device 100. The multiple minimized differential data signals 101 include D0, D1 and D2 signals, which are known TMDS signals that are transmitted using voltage difference between two pins (D+ and D−). The multiple differential signals 103 include CEC signals, HPD signals, I2C signals and VDD signals, but are not limited to such. The multiple differential signals 103 may also include other signals that are not the minimized differential data signals 101, depending on the format of the HDMI used. The I2C and CEC signals can be exchanged between the signal source 110 and multimedia signal transmission device 100, while the VDD and HPD signals are transmitted in only one direction from the signal source 110 to the multimedia signal transmission device 100.

Referring to FIG. 6, and also referring to FIGS. 2-5, in step S602, the clock signal detector 130 receives the clock signal 102, and detects the clock signal 102 to generate a clock index 105 and transmits the clock index 105 to a first microcontroller unit 150. The first microcontroller unit 150 receives the multiple differential signals 103 and the clock index 105, and combines the multiple differential signals 103 and the clock index 105 into multiple packets 104, and transmits the multiple packets 104 to the first photoelectric module 120. It should be noted that the first microcontroller unit (MCU) 150 described here is a single chip that includes a central processing unit (CPU), memory, timer/counter, various input/output interfaces or devices such as analog-digital converter, timer, serial port, and other serial communication interface such as I2C, Serial Peripheral Interface, LAN controller, etc., and is not limited to such. These integrated devices can be operated by specific commands. In this embodiment, the first microcontroller unit 150 may further include a first high speed sampling device 152, which can use high speed sampling techniques to combine the multiple differential signals 103 and the clock index 105 into multiple packets 104 and transmit them to the first photoelectric module 120. For example, the first high speed sampling device 152 of the first microcontroller unit 150 combines the SCLK signal of the I2C, the SDA signal of the I2C, the HPD signal, the VDD signal, and the CEC signal in a predetermined sequence to form the multiple packets 104. The sequence is not limited to the example shown here and other sequences may be used, as long as the sequence is the same in the multiple packets 104, and the clock index 105 uses another packet format.

Referring to FIG. 6, and also referring to FIGS. 2-5, in step S602, the first photoelectric module 120 transmits the multiple minimized differential data signals 101 received from the signal source 110 and the multiple packets 104 to the optical fibers 170. The first photoelectric module 120 may include light emitting devices, light detecting devices, light guiding devices, optical fiber connectors such as FC type, SC type, ST type, LC type, and MT-RJ type, as well as a transmission module such as Giga Bitrate Interface Converter (GBIC), Small Form Pluggable (SFP) transceiver, Quad Small Form-factor Pluggable (QSFP) transceiver, etc.

The optical fibers may include single mode optical fibers or multi-mode optical fibers. It should be noted that the photoelectric module and optical fiber combination described above are only examples but are not limiting, and any suitable combinations may be used based on practical needs of the optical communication channel. The first photoelectric module 120 is configured to convert the multiple minimized differential data signals 101 and the multiple packets 104 (electrical signals) into optical signals and to transmit the optical signals to the second photoelectric module via the optical fibers. In step S602, a first level shifter 160 is optionally used, coupled between the first photoelectric module 120 and the signal source 110, to adjust the input voltage level to an appropriate level.

Referring to FIG. 6, and also referring to FIGS. 2-5, in step S603, in this embodiment, the optical fibers 170 include a four-channel bundle QSFP connected between the first photoelectric module 120 and second photoelectric module 122. The first photoelectric module 120 transmits the D0, D1 and D2 signal of the multiple minimized differential data signals 101 respectively to three of the four channels of the optical fibers 170, and transmits the multiple packets 104 to one of the four channels of the optical fibers 170. The optical fibers 170 transmit the multiple minimized differential data signals 101 and the multiple packets 104 to the second photoelectric module 122.

Referring to FIG. 6, and also referring to FIGS. 2-5, in step S604, the second photoelectric module 122 is coupled to the other end of the optical fibers 170, and configured to receive the multiple minimized differential data signals 101 and the multiple packets 104 (optical signals) transmitted by the first photoelectric module 120, and to convert the optical signal back to the original multiple minimized differential data signals 101 and the multiple packets 104 (electrical signal). The second photoelectric module 122 may include light emitting devices, light detecting devices, light guiding devices, optical fiber connectors such as FC type, SC type, ST type, LC type, and MT-RJ type, as well as a transmission module such as Giga Bitrate Interface Converter (GBIC), Small Form Pluggable (SFP) transceiver, Quad Small Form-factor Pluggable (QSFP) transceiver, etc., but are not limited to such. The second photoelectric module 122 transmits one of the multiple minimized differential data signals 101 to the clock data recovery circuit 140, transmits the multiple packets 104 to the second microcontroller unit 151, and transmits two of the multiple minimized differential data signals 101 to the destination device 180. The second microcontroller unit 151 converts the multiple packets 104 back to the multiple differential signals 103 and the clock index 105, and transmits the multiple differential signals 103 to the destination device 180. For example, the second high speed sampling device 153 of the second microcontroller unit 151 converts the received multiple packets 104 back to the SCLK signal of the I2C, the SDA signal of the I2C, the HPD signal, the VDD signal, and the CEC signal. The SDA signal and the HPD signal are transmitted bi-directionally, so the second microcontroller unit 151 can combine the SDA signal and the HPD signal again into packets and transmit them via the optical fibers 170 and the photoelectric modules 120 and 122 back to the first microcontroller unit 150. Thus, the SDA signal and the HPD signal can be transmitted between the signal source 110 and the destination device 180.

Referring to FIG. 6, and also referring to FIGS. 2-5, step S604 includes using the clock data recovery circuit 140. The clock data recovery circuit 140 may be a circuit, coupled to the second photoelectric module 122 and second microcontroller unit 151. The clock data recovery circuit 140, after receiving the clock index 105 and the one of the multiple minimized differential data signals 101, extracts the frequency setting value (which specifies the frequency of the original clock signal 102) from them, and recovers (re-generates) the original clock signal 102 which has the specified frequency and is synchronized to the minimized differential data signal. This method reduces interferences of the multiple minimized differential data signals 101 during transmission, and to achieve synchronous clock signals 102 at the two ends of the transmission. The functions of the clock data recovery circuit 140 is so that the multimedia signal transmission device 100 does not need to transmit the clock signal 102 via the optical fibers 170, and does not need to combine the clock signal 102 and the multiple minimized differential data signals 101 into packets. This allows the signal transmission to maintain sufficient signal quality, and at the same time, to eliminate the design cost involved with FPGA which is used in conventional technology to package the clock signal. After synchronously recovering the original clock signal 102 using the one of the multiple minimized differential data signals 101 and the clock index 105, the clock data recovery circuit 140 transmits the clock signal 102 and the one of the multiple minimized differential data signals 101 to the destination device 180. In step S604, a second level shifter 162 is optionally used, coupled between the second photoelectric module 122 and the destination device 180, to adjust the output voltage level to an appropriate level.

Referring to FIG. 6, and also referring to FIGS. 2-5, in step S605, the destination device 180 receives the multiple minimized differential data signals 101, the clock signal 102 and the multiple differential signals 103 from the multimedia signal transmission device 100.

While the embodiments are described in detail, it will be apparent to those skilled in the art that various modification and variations can be made in the multimedia signal transmission device and related method of the present invention without departing from the spirit or scope of the invention. Thus, it is intended that the present invention cover modifications and variations that come within the scope of the appended claims and their equivalents.

What is claimed is:

1. A multimedia signal transmission device comprising:
a clock signal detector, coupled to a signal source, for detecting a clock signal inputted from the signal source and generating a clock index which contains information specifying a frequency of the clock signal;
a first microcontroller unit, coupled to the signal source, for receiving the clock index generated by the clock signal detector, and for receiving multiple differential signals inputted from the signal source, wherein the first microcontroller unit includes a first high speed sampling device, which uses high speed sampling techniques to sample the multiple differential signals and the clock index and to combine sampled data into multiple packets;
a first photoelectric module, coupled to the first microcontroller unit and the signal source, for receiving multiple minimized differential data signals inputted from the signal source and the packets transmitted from the first microcontroller unit and converting them to optical signals;
a second photoelectric module, coupled to the first photoelectric module, for receiving the optical signals from the first photoelectric module and converting them to the multiple minimized differential data signals, the clock index and the multiple differential signals;

a second microcontroller unit, coupled to the second photoelectric module, for generating the clock index and the multiple differential signals; and a clock data recovery circuit, coupled to the second microcontroller unit and the second photoelectric module, for receiving one of the multiple minimized differential data signals inputted from the second photoelectric module and receiving the clock index from the second microcontroller unit, and for recovering the clock signal which has the frequency specified in the clock index and is synchronized to the one of the multiple minimized differential data signals.

2. The multimedia signal transmission device of claim 1, wherein the signal source transmits the multiple minimized differential data signals, the clock signal and the multiple differential signals to the multimedia signal transmission device, and wherein the destination device receives the multiple minimized differential data signals, the clock signal and the multiple differential signals via the first photoelectric module and the second photoelectric module of the multimedia signal transmission device.

3. The multimedia signal transmission device of claim 1, wherein the multiple differential signals include VDD signals, HPD signals, I2C signals and CEC signals, and wherein the multiple minimized differential data signals include D0, D1 and D2 signals.

4. The multimedia signal transmission device of claim 1, wherein the second microcontroller unit includes a second high speed sampling device, which uses high speed sampling techniques to convert the multiple packets back to the multiple differential signals and the clock index.

5. The multimedia signal transmission device of claim 4, wherein the first high speed sampling device uses high speed sampling techniques to combine the multiple differential signals and the clock index sampled in a predetermined sequence into the multiple packets and the second high speed sampling device uses high speed sampling techniques to convert the multiple packets back to the multiple differential signals and the clock index.

6. The multimedia signal transmission device of claim 1, further comprising four channel optical fibers connected between the first photoelectric module and the second photoelectric module using Quad Small Form-factor Pluggable (QSFP) connection, wherein the first photoelectric module transmits D0, D1 and D2 signals respectively to three of the four channels of the optical fibers, and the first photoelectric module transmits the multiple packets to one of the four channels of the optical fibers.

7. The multimedia signal transmission device of claim 1, further comprising a first level shifter, coupled between the first photoelectric module and the signal source, for adjusting an input voltage level.

8. The multimedia signal transmission device of claim 7, further comprising a second level shifter, coupled between the second photoelectric module and the destination device, for adjusting an output voltage level.

9. A multimedia signal transmission method comprising:
transmitting multiple minimized differential data signals, a clock signal and multiple differential signals from a signal source to a multimedia signal transmission device;

a clock signal detector receiving the clock signal, detecting the clock signal to generate a clock index which contains information specifying a frequency of the clock signal, and transmitting the clock index to a first microcontroller unit;

the first microcontroller unit receiving the multiple differential signals and the clock index, using high speed sampling techniques to sample the multiple differential signals and the clock index and to combine sampled data into multiple packets, and transmitting the multiple packets to a first photoelectric module;

the first photoelectric module converting the multiple minimized differential data signals from the signal source and the multiple packets to optical signals and transmitting them over plurality of optical fibers;

the optical fibers transmitting the optical signals of the multiple minimized differential data signals and the multiple packets to a second photoelectric module;

the second photoelectric module receiving the optical signals and converting them back to the multiple minimized differential data signals from the signal source and the multiple packets, transmitting one of the multiple minimized differential data signals to a clock data recovery circuit, transmitting the multiple packets to a second microcontroller unit, and transmitting two of the multiple minimized differential data signals to a destination device;

the second microcontroller unit converting the multiple packets back to the multiple differential signals and the clock index, transmitting the multiple differential signals to the destination device, and transmitting the clock index to the clock data recovery circuit;

the clock data recovery circuit receiving the one of the multiple minimized differential data signals and the clock index, recovering the clock signal which has the frequency specified in the clock index and is synchronized to the one of the multiple minimized differential data signals, and transmitting the recovered clock signal to the destination device; and the destination device receiving the multiple minimized differential data signals, the clock signal and the multiple differential signals from the multimedia signal transmission device.

10. The multimedia signal transmission method of claim 9, wherein the multiple differential signals include CEC signals, HPD signals, I2C signals and VDD signals, and wherein the multiple minimized differential data signals include D0, D1 and D2 signals.

11. The multimedia signal transmission method of claim 9, wherein the second microcontroller unit uses high speed sampling techniques to convert the multiple packets back to the multiple differential signals and the clock signal.

12. The multimedia signal transmission method of claim 11, wherein the high speed sampling techniques is used to sample the multiple differential signals and the clock index in a predetermined sequence and combines them into the multiple packets or convert the multiple packets back to the multiple differential signals and the clock index.

13. The multimedia signal transmission method of claim 9, further comprising connecting four channel optical fibers between the first photoelectric module and the second photoelectric module using Quad Small Form-factor Pluggable (QSFP) connection, wherein the first photoelectric module transmits D0, D1 and D2 signals respectively to three of the four channels of the optical fibers, and the first photoelectric module transmits the multiple packets to one of the four channels of the optical fibers.

14. The multimedia signal transmission method of claim 9, further comprising adjusting an input voltage level using a first level shifter coupled between the first photoelectric module and the signal source.

15. The multimedia signal transmission method of claim 14, further comprising adjusting an output voltage level using a second level shifter coupled between the second photoelectric module and the destination device.

\* \* \* \* \*